April 30, 1935. L. V. BLACK 1,999,558
FORM FOR BENDING GLASS
Filed Jan. 26, 1934 3 Sheets-Sheet 1
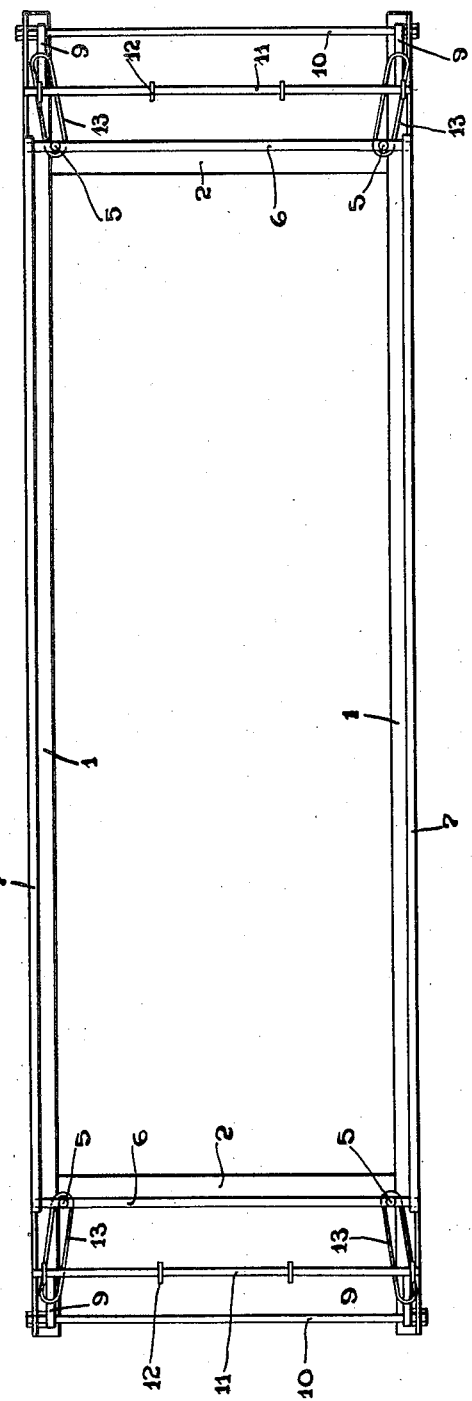
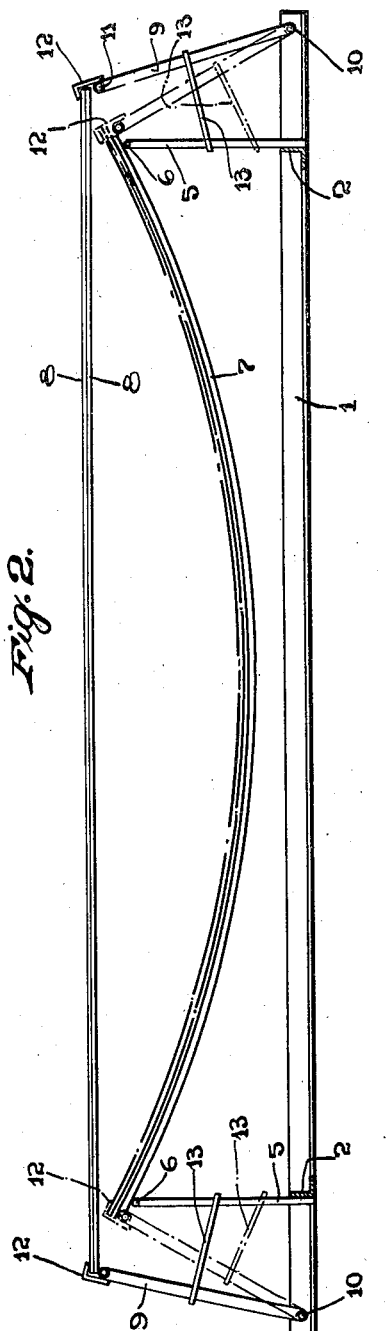
INVENTOR
LLOYD V. BLACK.
BY Bradley & Bee
ATTORNEYS.

April 30, 1935.  L. V. BLACK  1,999,558
FORM FOR BENDING GLASS
Filed Jan. 26, 1934  3 Sheets-Sheet 3

INVENTOR
LLOYD V. BLACK.
BY
ATTORNEYS.

Patented Apr. 30, 1935

1,999,558

UNITED STATES PATENT OFFICE 1,999,558

FORM FOR BENDING GLASS

Lloyd V. Black, Tarentum, Pa., assignor to Pittsburgh Plate Glass Company, a corporation of Pennsylvania Application January 26, 1934, Serial No. 708,422

7 Claims. (Cl. 49—67)

Figure 3:
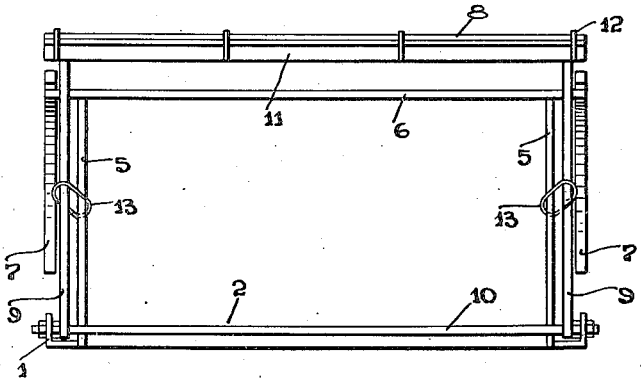
Figure 4:
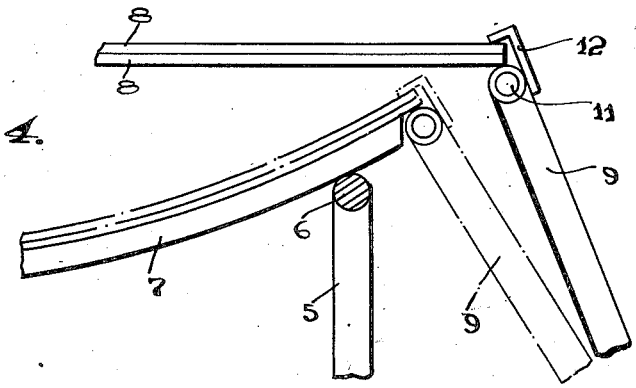
Figure 5:
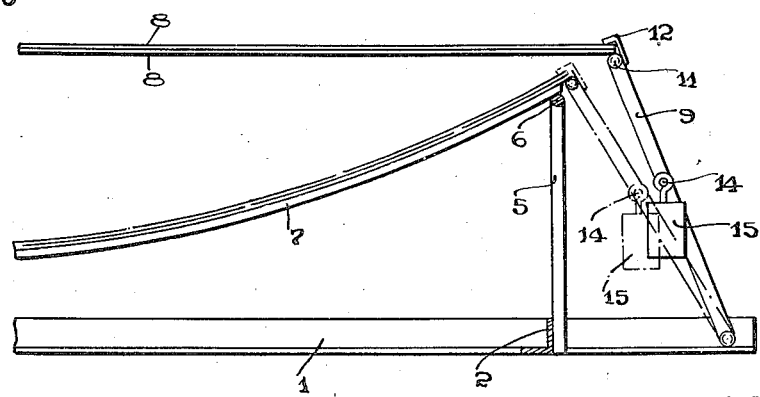
Figure 6:
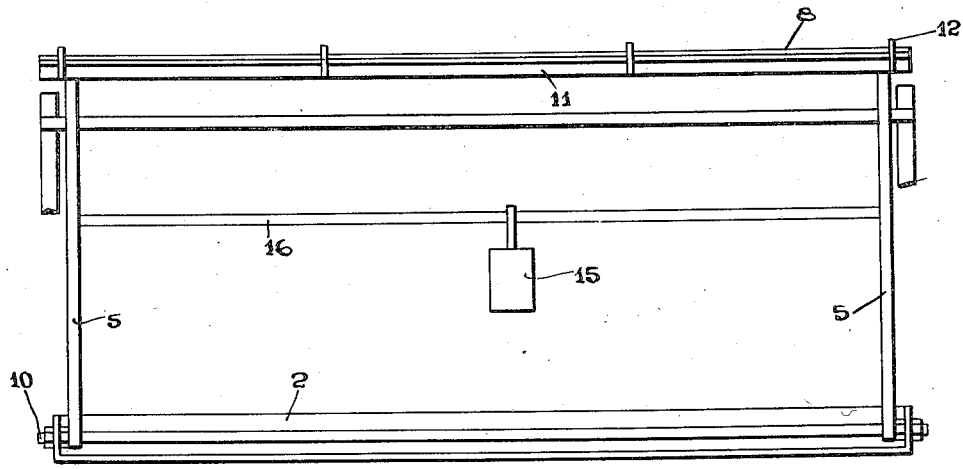
Figure 7:
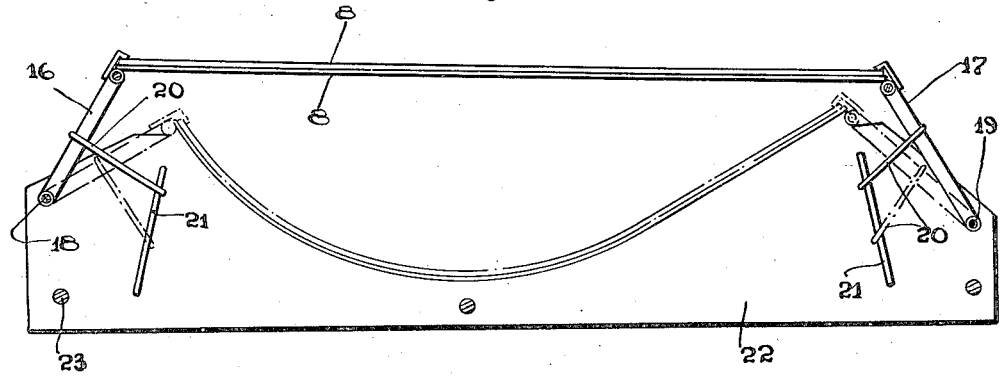

The invention relates to a form for bending glass sheets or plates. The common method of bending glass is to place the flat glass on a concave mold and then apply sufficient heat to soften the glass and allow it to sag to fit the contour of the mold. Since the length of the flat glass is always longer than the chord of the finished curve, the ends of the glass always have to slip for a distance along the mold toward the center. This sets up considerable friction, so that a high temperature must be used to cause the glass to sag. Also in making a bend of this kind, there is a tendency for the corners of the glass to bend upward and the very soft condition of the glass aggravates this condition to such an extent that it is necessary to insert a tool in the kiln to push the corners down to fit the mold. This of course distorts the glass. The whole surface of the glass is usually more or less damaged by the very soft glass coming in contact with the uneven surface of the mold. The object of the present invention is to provide means by the use of which the resistance to bending due to friction is avoided and further to cause an endwise pressure to be exerted upon the glass sheet so that it will bind or sag and engage the form at a lower temperature than is the case in the practice of the bending operation as heretofore described, thus speeding up the operation and reducing the tendency to mar the glass. A further object of the invention is to provide means whereby any tendency of the corners of the sheet to bend up is avoided. Certain embodiments of the invention are shown in the accompanying drawings, wherein:

Figure 1 is a plan view of the apparatus. Fig. 2 is a side elevation. Fig. 3 is an end view. Fig. 4 is a partial side elevation on an enlarged scale. Fig. 5 is a partial side elevation illustrating a modification. Fig. 6 is an end view of the construction of Fig. 5. And Fig. 7 is a side elevation of another modification.

Referring first to the construction shown in Figs. 1 to 4, the framework of the form or mold consists of the longitudinal angles 1, 1, connected together at the ends by the transverse angles 2, 2, provided at the four corners with the four posts 5, 5, 5, 5 of relatively light material welded at their lower ends to the flanges of the angles 2, 2. The upper ends of each pair of posts 5, 5 are connected by means of the transverse rods 6, 6, the rods and posts being preferably welded together. The mold members or shapes, which determine the curvature of the glass sheets, comprise a pair of bars 7, 7 bent to the same curvature and welded at their ends to the transverse rods 6, 6.

The glass sheets or plates 8, 8 are illustrated as being bent in pairs, which is the procedure followed when the glass sheets are to be laminated to form safety glass, but it will be understood that single sheets may be bent if desired. The glass sheets are supported preliminarily to the bending operation, and during such operation until the sheets are bent so that they engage the members 7, 7, by means of pivoted frames located at the ends of the angles 1, 1. These frames each comprise a pair of side bars 9, 9 pivoted upon a transverse rod 10 and connected at their upper ends by a pipe 11. This pipe is preferably of poor conduction material, such as chrome steel and should be of as small mass as possible so that it will heat at about the same rate as the glass. These pipes 11 act as supports for the end edges of the glass sheets 8, 8 and are provided with stop members 12 in the form of hooks whose upper ends extend over the surface of the upper sheet of glass at the edge thereof.

Links 13, 13 are employed which extend around the posts 5 and bars 9 and limit the swinging movement of the two end frames away from each other. These links serve to position the end frames and keep the glass properly centralized with respect to the mold preliminarily to the bending operation. The links slip downward as the glass sags and the bars 9, 9 move inward, so that such bars carrying the ends of the glass are always free to move in with the glass as it sags, but under no condition can they move outward so that the glass can not get out of position or fall from its supports.

In operation, the glass sheets 8, 8 to be bent are supported, as indicated in full lines in Fig. 2, and the form carrying the sheet is transported through a tunnel kiln or leer, where the glass is exposed to a temperature sufficient to soften the glass so that it will sag and engage the members 7, 7. This bending will occur at a temperature somewhere between 900 and 1050 degrees F., and at such temperatures the glass will not mar where it contacts with the bars 7, 7. After the bending operation, the form with the glass carried thereon is moved through an atmosphere of gradually decreasing temperatures in the leer until the glass reaches handling temperature. The use of the swinging frames at the ends of the form for supporting the glass sheets preliminary to and during the bending operation, makes it possible to bend the glass at a lower temperature than would be the case if the swinging supports were dispensed with and the ends of the glass sheets were supported upon the transverse rods 6, 6 during the bending operation. So supported, the glass sheets would have to drag over the bars 6, 6 and the friction thus applied would tend to prevent the sheets from bending and would also tend to mar them as heretofore pointed out. The use of the swinging end members also gives a pressure on the glass sheets longitudinally thereof, due to the weight of the glass, so that this condition further promotes the bending of the sheets so that they will bend at a lower temperature than would otherwise be the case. This force which is applied longitudinally of the sheets depends upon the angles which the bars 9, 9 occupy at the beginning of the bending operation and increases as the pivot points 10, 10 of the swinging frames are moved away from each other, so that in the design of the apparatus, it is possible to reduce the temperature at which the glass will bend to quite a degree, and thus reduce any danger incident to marring it due to its contact with the members 7, 7.

The stop members 12 which engage the end edges of the glass sheets, preferably have their upper edges turned over the tops of the glass sheets, as illustrated, thus forming hooks, as this construction obviates any tendency of the corners of the sheets to warp upward during the bending operation. The arc upon which the end frames swing is preferably so adjusted that the ends of the glass sheets will not engage the ends of the curved bars 7, 7 until the glass sheet intermediate the ends of the bars engages such bars. The dot and dash lines serve to indicate the position of the parts when the bending operation is completed.

Figs. 5 and 6 illustrate a modification in which a transverse bar 14 is provided between the swinging bars 9, 9 and a weight 15 is supported upon such bar. The use of this weight increases the tendency of the end members to swing toward each other, so that still greater pressure is applied toward the center of the glass sheets, and as a result, bending will occur at a somewhat lower temperature when a weight of this kind is used than in the construction of Figs. 1 to 4, in which no means are provided other than the weight of the glass sheets for causing the swinging frames to move toward each other. The invention is obviously not limited to the use of weights for accomplishing the desired function, as any other suitable means acting yieldingly to swing the end members toward each other may be used.

Fig. 7 illustrates a modification in which the glass is bent to an irregular curve, the curvature at the left hand ends of the sheets being relatively sharp, while the right hand ends are more or less straightened out. In bending the glass sheets 8, 8 to this contour, the swinging end members 16 and 17 are pivoted at different levels, the pivot 18 being at a higher level than the pivot 19, so that the sheets when positioned preliminary to bending occupy the inclined position shown. The position of the members 16 and 17 is governed in this construction by means of the links 20, 20 passing around bars 21, 21 carried by the plates 22, 22, which in this case constitute the bending forms. The two plates 22, 22 are held in their proper relative positions by means of transverse tie rods 23 so that the plates with the tie rods constitute the entire frame of the apparatus. The ends of the swinging members 16 and 17 are so positioned relatively that the end of the glass which has to bend most, is located higher and further past the end of the mold than the other end, thus compensating for the greater movement of this end as compared with the other end which has a flatter bend.

What I claim is:

1. A form for bending a glass sheet having the contour to which the sheet is to be bent, and members for suporting the ends of the sheet pivoted at the ends of the form for swinging movement toward and from each other and having their upper ends which carry the sheet above the top of the form.

2. A form for bendng a glass sheet having the contour to which the sheet is to be bent, members for supporting the ends of the sheet pivoted at the ends of the form for swinging movement toward and from each other and having their upper ends above the top of the form, and means for limiting their movement away from each other, but permitting them to swing toward each other as the sheet bends.

3. A form for bending a glass sheet having the contour to which the sheet is to be bent, members for supporting the ends of the sheet pivoted at the ends of the form for swinging movement toward and from each other and having their upper ends above the top of the form, and stop means on said members projecting above the tops thereof and adapted to engage the edges of the glass sheet.

4. A form for bending a glass sheet having the contour to which the sheet is to be bent, members for supporting the ends of the sheet pivoted at the ends of the form for swinging movement toward and from each other and having their upper ends above the top of the form, means for limiting their movement away from each other, but permitting them to swing toward each other as the sheet bends, and stop means on said members projecting above the tops thereof and adapted to engage the edges of the glass sheet.

5. A form for bending a glass sheet having the contour to which the sheet is to be bent, members for supporting the ends of the sheet pivoted at the ends of the form for swinging movement toward and from each other and having their upper ends above the top of the form, and means tending to swing said members toward each other.

6. A form for bending a glass sheet having the contour to which the sheet is to be bent, members for supporting the ends of the sheet pivoted at the ends of the form for swinging movement toward and from each other and having their upper ends above the top of the form, and stop means on said members in the form of hooks projecting above the tops of the members with their upper ends adapted to project over the upper surface of the sheet at the edge thereof.

7. A form for bending a glass sheet comprising side members having the contour to which the sheet is to be bent, and end members for supporting at their upper ends the ends of the sheet, said end members being pivoted at their lower ends and being inclined toward each other, so that their upper ends which support the glass sheet are closer to each other than are their lower ends.

LLOYD V. BLACK.